US012683924B2

(12) United States Patent (10) Patent No.: US 12,683,924 B2
Lin (45) Date of Patent: Jul. 14, 2026

(54) DATA TRANSMISSION METHOD AND DATA TRANSMISSION DEVICE

(71) Applicant: GUANGZHOU SHIZHEN INFORMATION TECHNOLOGY CO., LTD., Guangzhou (CN)

(72) Inventor: Jinhao Lin, Guangzhou (CN)

(73) Assignee: GUANGZHOU SHIZHEN INFORMATION TECHNOLOGY CO., LTD., Guangzhou (CN)

( * ) Notice: Subject to any disclaimer, the term of this patent is extended or adjusted under 35 U.S.C. 154(b) by 40 days.

(21) Appl. No.: 18/864,886

(22) PCT Filed: Oct. 21, 2022

(86) PCT No.: PCT/CN2022/126765
§ 371 (c)(1),
(2) Date: Nov. 11, 2024

(87) PCT Pub. No.: WO2024/082278
PCT Pub. Date: Apr. 25, 2024

(65) Prior Publication Data
US 2025/0310295 A1 Oct. 2, 2025

(51) Int. Cl.
*H04L 61/5038* (2022.01)
*G06F 3/14* (2006.01)
(Continued)

(52) U.S. Cl.
CPC ........ *H04L 61/256* (2013.01); *H04L 41/0895* (2022.05); *H04L 41/40* (2022.05)

(58) Field of Classification Search
CPC .............. H04L 61/256; H04L 61/2514; H04L 61/5038; H04L 61/00; H04L 61/12;
(Continued)

(56) References Cited

U.S. PATENT DOCUMENTS 9,654,753 B1 * 5/2017 Balasubramaniam ......................
G06F 15/8007
2011/0173348 A1 * 7/2011 Van De Poel ........ H04L 67/563
709/249
(Continued)

FOREIGN PATENT DOCUMENTS

CN 202758595 U * 2/2013
CN 111316224 A 6/2020
(Continued)

OTHER PUBLICATIONS

Wikipedia, "Ethernet over USB," retrieved 2026. (Year: 2026).*
(Continued)

*Primary Examiner* — Alina A Boutah
(74) *Attorney, Agent, or Firm* — Zhong Law, LLC

(57) ABSTRACT

The disclosure presents a data transmission method and device with a processor, a universal interface, and a wireless communication module. The method includes connecting the universal interface to a processing device. The processor creates a virtual network card and links the virtual network card to the wireless module via bridging or network address translation. The processor responds to request instructions from the processing device, retrieves screen transmission control and media data, and parses control data to determine control data to be forwarded. The processor controls the virtual network card to send the control data to the wireless communication module. The processor controls the wireless communication module to send the control data to the display device. Based on the forwarded control data, the processor decides whether to transmit the media data to the display device.

14 Claims, 5 Drawing Sheets

(51) Int. Cl.

| | | |
|---|---|---|
| *G09G 5/00* | (2006.01) | |
| *H04L 41/0895* | (2022.01) | |
| *H04L 41/40* | (2022.01) | |
| *H04L 61/2514* | (2022.01) | |
| *H04L 61/256* | (2022.01) | |

(58) Field of Classification Search
CPC ..... H04L 61/01; H04L 41/0895; H04L 41/40; H04L 41/08; H04L 41/0803; H04L 67/141; H04L 51/066; H04L 51/08; H04L 9/00; H04L 1/00; G09G 2370/025; G09G 2370/042; G09G 2370/10; G09G 2370/16; G09G 5/006; G06F 3/1454; H04B 7/00; H04W 4/00
See application file for complete search history.

(56) References Cited

U.S. PATENT DOCUMENTS

| | | | | |
|---|---|---|---|---|
| 2012/0117278 | A1* | 5/2012 | Salamon | H04L 12/2832 |
| | | | | 710/16 |
| 2012/0246359 | A1* | 9/2012 | Scragg, Jr. | G06F 13/10 |
| | | | | 710/63 |
| 2014/0211879 | A1* | 7/2014 | Yuan | H04B 7/0689 |
| | | | | 375/267 |
| 2015/0244584 | A1* | 8/2015 | Vernia | G06F 9/455 |
| | | | | 715/736 |
| 2015/0331821 | A1* | 11/2015 | Liston | H04L 12/10 |
| | | | | 710/106 |
| 2016/0350058 | A1* | 12/2016 | Zhu | H04N 21/4126 |
| 2017/0249165 | A1* | 8/2017 | Lu | G06F 9/4411 |
| 2019/0116224 | A1* | 4/2019 | Yu | H04L 9/0897 |
| 2019/0129681 | A1* | 5/2019 | Liu | G06F 3/0416 |
| 2023/0342101 | A1* | 10/2023 | Geddes | H04N 7/147 |
| 2023/0418540 | A1* | 12/2023 | Skinner | G06F 3/1454 |

FOREIGN PATENT DOCUMENTS

| | | | | | |
|---|---|---|---|---|---|
| CN | 111459433 | A | | 7/2020 | |
| CN | 114844745 | A | | 8/2022 | |
| CN | 115087132 | A * | 9/2022 | | G06F 3/1454 |
| CN | 115202600 | A * | 10/2022 | | H04L 63/0428 |
| CN | 115914694 | A * | 4/2023 | | |
| WO | WO-2011150883 | A2 * | 12/2011 | | H04L 41/082 |
| WO | 2022143508 | A | | 7/2022 | |

OTHER PUBLICATIONS

Written Opinion of the International Search Authority issued in PCT Application No. PCT/CN2022/126765, mailed Jul. 8, 2023, with translation, 5 pages.
International Search Report issued in PCT Application No. PCT/CN2022/126765, mailed Jul. 8, 2023, with translation, 5 pages.
Supplementary European Search Report received for European Patent Application No. 22962461, mailed on Oct. 15, 2025.
Office Action received for European Patent Application No. 22962461, mailed on Oct. 15, 2025.

\* cited by examiner

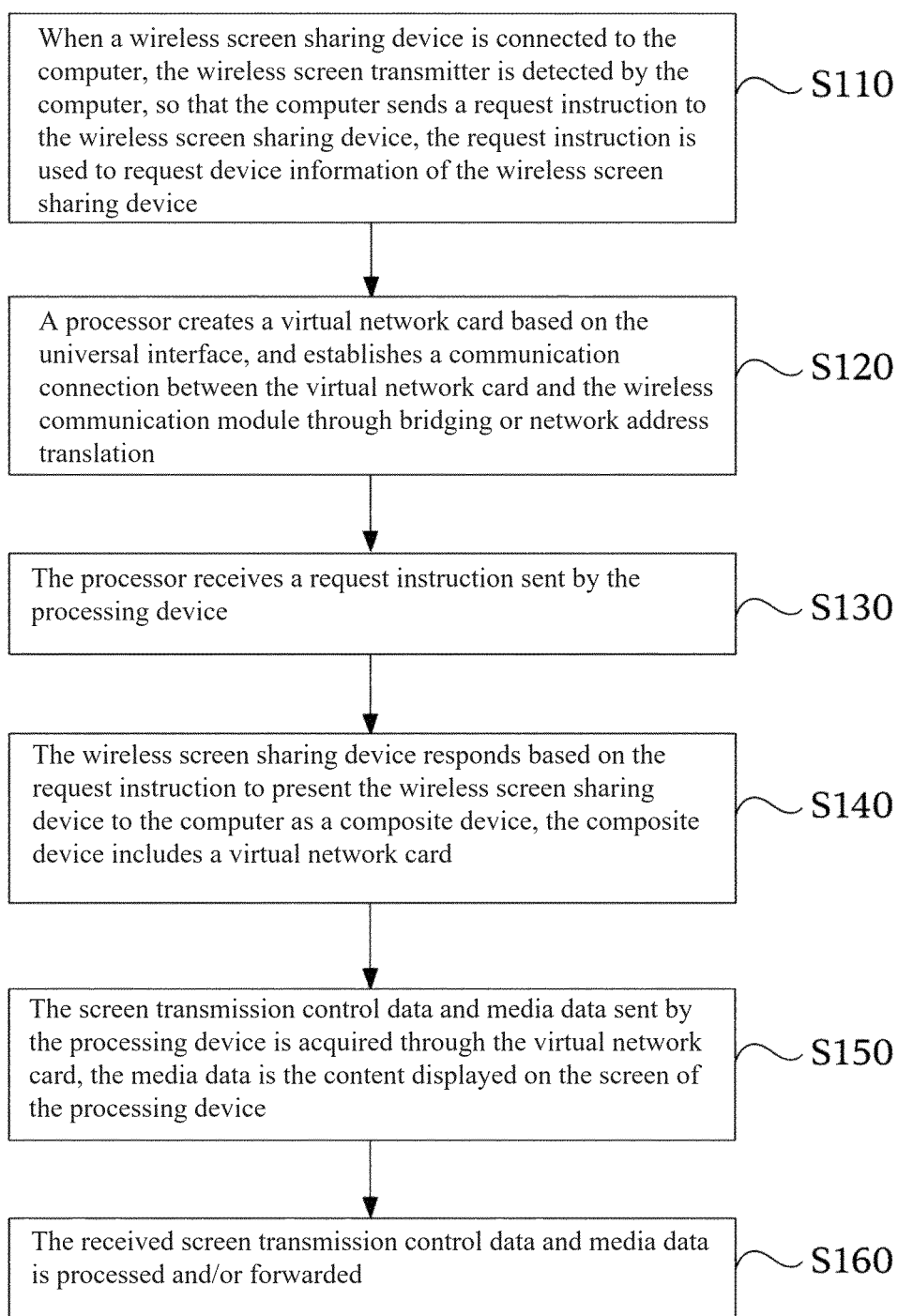

When a wireless screen sharing device is connected to the computer, the wireless screen transmitter is detected by the computer, so that the computer sends a request instruction to the wireless screen sharing device, the request instruction is used to request device information of the wireless screen sharing device                                          S110

A processor creates a virtual network card based on the universal interface, and establishes a communication connection between the virtual network card and the wireless communication module through bridging or network address translation                                          S120

The processor receives a request instruction sent by the processing device                                          S130

The wireless screen sharing device responds based on the request instruction to present the wireless screen sharing device to the computer as a composite device, the composite device includes a virtual network card                                          S140

The screen transmission control data and media data sent by the processing device is acquired through the virtual network card, the media data is the content displayed on the screen of the processing device                                          S150

The received screen transmission control data and media data is processed and/or forwarded                                          S160

Fig. 1

| A12 | A11 | A10 | A9 | A8 | A7 | A6 | A5 | A4 | A3 | A2 | A1 |
|-----|-----|-----|------|------|-----|-----|------|------|------|------|-----|
| GND | RX2+ | RX2- | VBUS | SBU1 | D- | D+ | CC | VBUS | TX1- | TX1+ | GND |
| GND | TX2+ | TX2- | VBUS | VCONN | D+ | D- | SBU2 | VBUS | RX1- | RX1+ | GND |
| B1 | B2 | B3 | B4 | B5 | B6 | B7 | B8 | B9 | B10 | B11 | B12 |

| Virtual-network-card creating unit | ~210 |
| Request-instruction receiving unit | ~220 |
| Request-instruction responding unit | ~230 |
| Screen-transmission-data receiving unit | ~240 |
| Screen-transmission-data processing unit | ~250 |

Data transmission device     212     213

Processor     Wireless communication module

Universal interface     Memory

First application 211     214a     214

20

DATA TRANSMISSION METHOD AND DATA TRANSMISSION DEVICE

CROSS-REFERENCE TO RELATED APPLICATIONS

This application is the U.S. National Phase under 35. U.S.C. § 371 of International Application PCT/CN2022/126765, filed Oct. 21, 2022. The disclosure of the above-described application is hereby incorporated by reference in its entirety.

TECHNICAL FIELD

The present disclosure relates to the field of data processing technology, and in particular, to a data transmission method and a data transmission device.

BACKGROUND

Screen sharing is a frequently used function in multi-person communication scenarios such as meetings and teaching. Common screen sharing methods involve a processing device (e.g., a personal computer or mobile phone) transmitting a screen image either through a wired or wireless connection to a display device with a large screen (monitor, TV, projector, etc.). The large screen of the display device displays the received screen image, allowing participants to share and display content more conveniently.

An existing screen sharing method is achieved through data transmission devices, such as wireless screen sharing devices. The wireless screen sharing device has a Universal Serial Bus (USB) interface (such as a USB2.0 interface or a Type-C interface) and a Wi-Fi module. The wireless screen sharing device is connected to a computer via the USB interface to acquire screen projection-related data content from the computer and then transmits it to a display device, such as a conference tablet, for processing. During the transmission process, the existing wireless screen sharing device typically enumerates itself to the computer as a Human Interface Device (HID) such as a keyboard, a mouse, or a camera, and then transmits the data content based on the HID communication channel. However, without changing hardware of the wireless screen sharing device, the data transmission bandwidth supported by HID is limited, resulting in a low transmission rate when the computer transmits the above content to the wireless screen sharing device, thereby restricting the quality and/or causing delays in processing the data on the display device.

SUMMARY

The present disclosure provides a data transmission method and a data transmission device to solve the technical problems of low transmission speed between processing devices and data transmission devices, which affects the quality and/or causes delays in content processing on display devices.

According to a first aspect of the present disclosure, a data transmission method is provided and applied to a data transmission device. The data transmission device includes a processor, a universal interface, and a wireless communication module, with both the universal interface and the wireless communication module connected to the processor. The universal interface is configured to connect with the processing device, the data transmission method includes:

detecting, by the processor, the universal interface when the universal interface is connected to the processing device;

creating, by the processor, a virtual network card based on the universal interface, and establishing a communication connection between the virtual network card and the wireless communication module through bridging or network address translation;

receiving, by the processor, a request instruction sent by the processing device, where the request instruction is used to request device information of the data transmission device;

presenting, by the processor, the data transmission device as a composite device to the processing device in response to the request instruction, where the composite device includes the virtual network card;

acquiring, by the processor, screen transmission control data and media data sent by the processing device through the virtual network card, where the media data is a content displayed on a screen of the processing device;

parsing, by the processor, the screen transmission control data to determine the control data to be forwarded;

based on the communication connection, controlling, by the processor, the virtual network card to send the control data to be forwarded to the wireless communication module, and controlling the wireless communication module to send the control data to be forwarded to the display device; and determining, by the processor, whether to send the media data to the display device based on the control data to be forwarded.

According to a second aspect of the present disclosure, a data transmission device is provided, including a universal interface, a wireless communication module and a processor; the universal interface and the wireless communication module are both connected to the processor, and the universal interface is configured to connect with the processing device;

when the data transmission device is connected to the processing device, the data transmission device is detected by the processing device, so that the processing device sends a request instruction to the data transmission device, where the request instruction is used to request device information of the data transmission device, the processing device is pre-installed with a universal driver, and the universal driver includes a virtual network card driver;

the processor is configured to:

present the data transmission device as a composite device to the processing device in response to the request instruction, where the composite device includes the virtual network card;

establish a first communication channel between the processing device and the virtual network card based on the setting of the virtual network card driver, where the virtual network card driver is run by the processing device based on a response call;

acquire screen transmission control data and media data sent by the processing device through the first communication channel;

parse the screen transmission control data to determine the control data to be forwarded;

determine whether to send the media data to the display device based on the control data to be forwarded; and send the control data to be forwarded to the display device through the wireless communication module, and if the processor determines to send the media data to the display device, send the media data to the display device.

According to a third aspect of the present disclosure, a data transmission device is further provided, including a universal interface, a virtual network card, a wireless communication module and a processor; the universal interface and the wireless communication module are both connected to the processor;

the universal interface is configured to connect with a processing device;

the virtual network card is configured to acquire screen transmission control data and media data from the processing device;

the processor is configured to parse the screen transmission control data acquired by the virtual network card to determine the control data to be forwarded and control the virtual network card to send the control data to be forwarded to the wireless communication module, and determine whether to control the virtual network card to send the media data to the wireless communication module based on the control data to be forwarded;

the wireless communication module is configured to send the control data to be forwarded to the display device, and to send the media data sent by the virtual network card to the display device.

In the above-mentioned data transmission method and data transmission device, the data transmission method is applied to the data transmission device, and the data transmission device includes a processor, a universal interface and a wireless communication module, the universal interface and the wireless communication module are both connected to the processor, and the universal interface is configured to connect with the processing device; the data transmission method includes: when the universal interface is connected to the processing device, the universal interface being detected by the processing device; the processor creating a virtual network card based on the universal interface, and establishing a communication connection between the virtual network card and the wireless communication module through bridging or network address translation; the processor receiving a request instruction sent by the processing device, where the request instruction is used to request device information of the data transmission device, the processor presenting the data transmission device as a composite device to the processing device in response to the request instruction, where the composite device includes the virtual network card; acquiring screen transmission control data and media data sent by the processing device through the virtual network card, where the media data is a content displayed on a screen of the processing device; the processor parsing the screen transmission control data to determine the control data to be forwarded; based on the communication connection, the processor controlling the virtual network card to send the control data to be forwarded to the wireless communication module, and controlling the wireless communication module to send the control data to be forwarded to the display device; and the processor determining whether to send the media data to the display device based on the control data to be forwarded. When the data transmission device is connected to the processing device, the data transmission device enumerates it as a virtual network card to the processing device, thereby establishing a network transmission channel based on the virtual network card. The data transmission device receives the screen transmission control data and media data in the screen sharing from the processing device through the network transmission channel, thereby improving the data transmission bandwidth. The transmission rate of the processing device to transmit the screen projection related content to the data transmission device is faster, thereby optimizing the quality and reducing delays in the data processing by the display device.

BRIEF DESCRIPTION OF THE DRAWINGS

The drawings described herein are used to provide further understanding of the present disclosure and constitute a part of the present disclosure. The illustrative embodiments of the present disclosure and their descriptions are used to explain the present disclosure and do not constitute improper limitations on the present disclosure. In the figures:

FIG. 1 is a method flowchart of a data transmission method according to an embodiment of the present disclosure.

DESCRIPTION OF THE PREFERRED EMBODIMENTS

Figure 2:
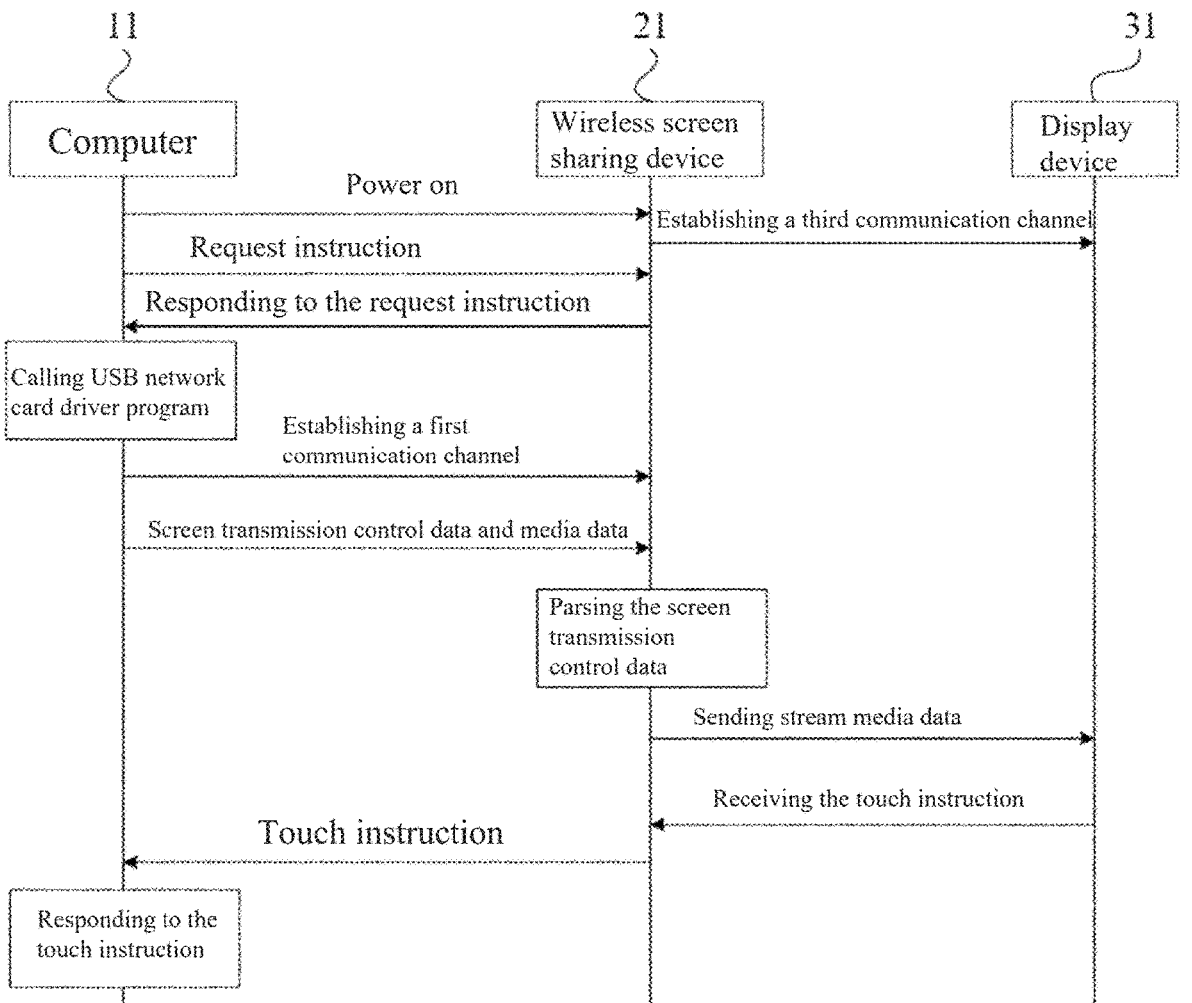
FIG. 2 is a schematic diagram of the data flow process during screen projection using the data transmission method according to an embodiment of the present disclosure.

The present disclosure is further described in detail below in conjunction with the accompanying drawings and embodiments. It should be understood that the specific embodiments described herein are used to explain the present disclosure rather than to limit the present disclosure. It should also be noted that, for the convenience of description, the drawings only show the parts related to the present disclosure rather than all structures.

It should be noted that due to space limitations, this description of the present disclosure does not list all optional implementation methods. After reading this description of the present disclosure, those skilled in the art should be able to understand that as long as the technical features do not contradict each other, any combination of technical features may constitute an optional implementation method.

When the data transmission device is running, it is connected between the processing device and the display device, and serves as a bridge for the processing device and the display device to transmit screen projection-related data during the screen projection process. In an embodiment of the present disclosure, the data transmission device may be a wireless screen sharing device. The processing device may be a terminal device such as a personal computer, PAD or mobile phone; the display device may be an interactive board or conference display device for meetings. The display device may have a receiving box, and the receiving box may be integrated with the display device or designed to be separate from the display device; the receiving box is configured to receive media data from the data transmission device and transmit it to the main processor of the display device to complete display and corresponding control. It does not limit the configuration of various devices as long as they can ensure the overall design framework of this solution. The data transmission device processes the audio and video data that currently needs to be output and displayed on the processing device so that the data may be displayed on the display device for more people to watch and share.

In the current technology, when a data transmission device is connected to a processing device for forwarding screen projection data, it is usually identified as an HID by the display device, and the screen projection data is transmitted based on the data protocol corresponding to the HID, as well as the control instructions generated by the display device during the screen projection process are transmitted to the processing device. However, the data transmission bandwidth supported by the HID is limited, resulting in a low transmission rate when the processing device transmits the above content to the data transmission device. During the transmission process, it is necessary to accept a lower quality for acquiring a better delay experience, or accept a larger delay for achieving better parameter indicators for the transmission data by reducing the parameter indicators of the transmission data. Balancing these two aspects may result in a situation where both quality and latency fail to meet the user's requirements.

Hereinafter, each embodiment will be described in detail by taking an example that the processing device serves as a computer and the data transmission device serves as a wireless screen sharing device.

FIG. 1 is a method flowchart of a data transmission method according to an embodiment of the present disclosure. The data transmission method is used for a data transmission device. Referring to FIG. 2, which illustrates a schematic diagram of a data transmission process used in a screen projection process. As shown in FIG. 1, the data transmission method includes:

Step S110: when a wireless screen sharing device is connected to the computer, the wireless screen sharing device is detected by the computer, so that the computer sends a request instruction to the wireless screen sharing device, the request instruction is used to request device information of the wireless screen sharing device.

The wireless screen sharing device may include a universal interface, which is usually set up in the form of a plug. When the user needs to share a screen, the universal interface of the wireless screen sharing device is plugged into the universal interface of the computer. The universal interface of the computer is usually set up in the form of a socket. There may be multiple different interface standards for universal interfaces under the same interface standard system (such as USB2.0 and USB3.0). The plugs and sockets corresponding to different interface standards may not be able to directly achieve physical connection (such as MicroUSB and Type-C). In this case, the connection may be achieved through a conversion device. When the plug on the wireless screen sharing device cannot be directly physically connected to the socket on the computer, the connection may be achieved through a conversion device. A power pin is set in the universal interface. When the wireless screen sharing device is connected to a computer, the computer may provide a basic working voltage to the wireless screen sharing device through the power pin. The working voltage may be 5V or other voltages. The wireless screen sharing device starts working under the power supply of the basic working voltage.

In the wireless screen sharing device, depending on different specific interface standards, there are special pins connected to pull-up resistors. The computer completes insertion detection based on the corresponding signal changes of the pull-up resistors before and after power supply. After detecting that a device is connected to the universal interface and waiting for stable power supply, the computer first conducts a speed type detection of the inserted wireless screen sharing device to determine whether the inserted wireless screen sharing device is a high-speed device or a low-speed device. The computer will then reset the connected device and detect whether the connected full-speed device supports high-speed mode. If the connected full-speed device supports high-speed mode, the connected full-speed device will switch to a high-speed signal mode. After the reset is completed, the computer uses a default address agreed upon by the protocol (e.g., 0) to conduct preliminary communication with the currently connected device. The initial communication is mainly to acquire a type of access device. In the initial communication, the computer sends an acquisition request instruction to the device corresponding to the default address. The request instruction is used to request the device information of the current access device, and corresponding to the application scenario of this solution, the request instruction is used to request the device information of the wireless screen sharing device. The device information is mainly used to describe the type of device, such as the HID described above. It may also describe the working parameters of the device, such as the rated working voltage.

According to an embodiment of the present disclosure, to achieve the desired data transmission effect, the computer is pre-installed with a universal driver. The universal driver includes a virtual network card driver. The universal driver is used to implement basic hardware drivers on the computer, and the virtual network card driver is used to virtualize a virtual network card based on the universal interface on the computer. The virtual network card sends and receives data through the universal interface in the form of network data packets.

Figures 3, 4:
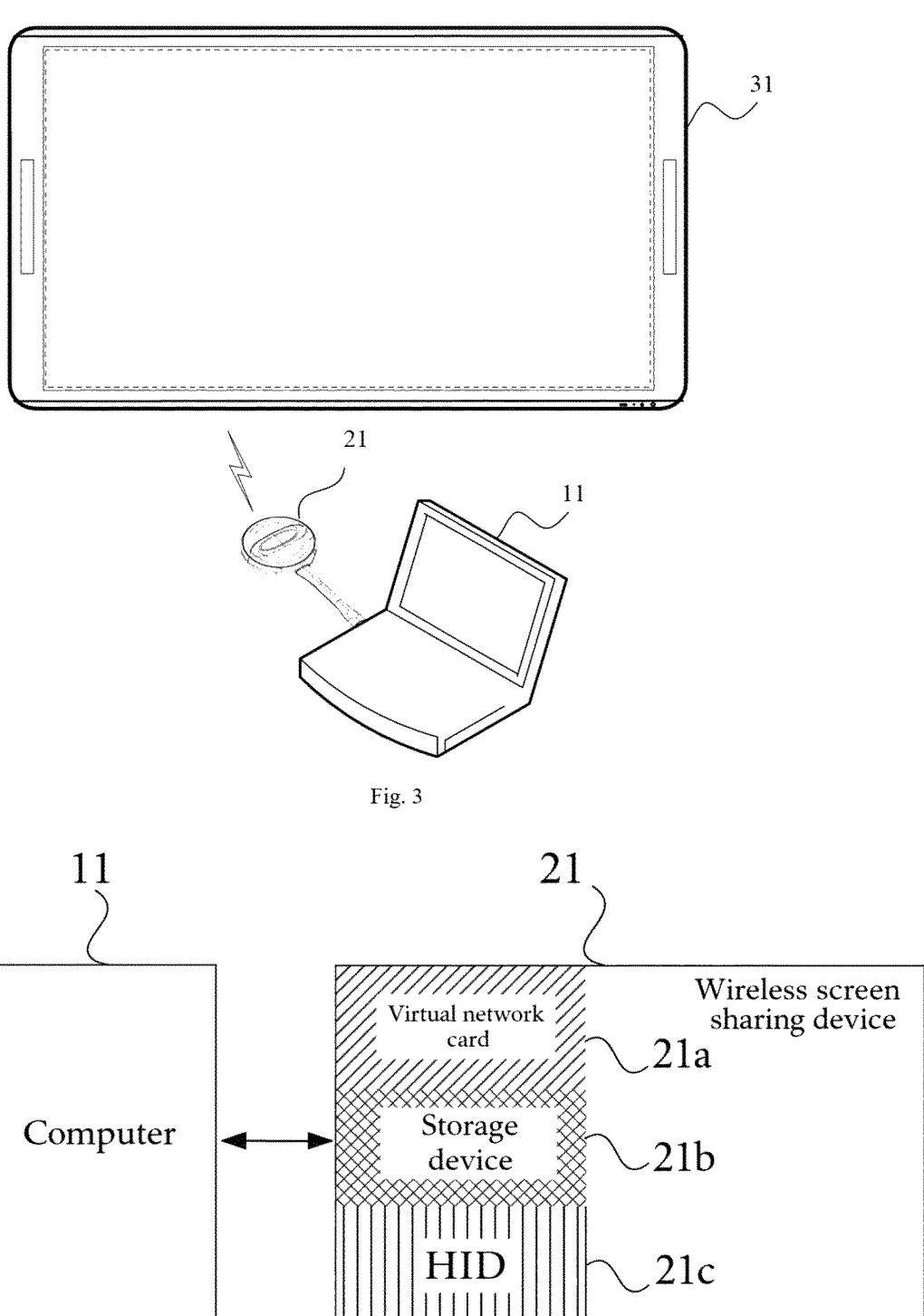
FIG. 3 is a schematic diagram of a device connection status during screen projection using a data transmission method according to an embodiment of the present disclosure.
FIG. 4 is a schematic diagram of a composite device in a data transmission method according to an embodiment of the present disclosure.

The device connection status after all connections are completed is shown in FIG. 3, the computer 11 is a laptop, the display device 31 is an interactive board with a large-size display screen, the display screen may be a touch display screen, and the wireless screen sharing device 21 is connected to the computer 11 through a universal interface and is connected to the display device 31 in wireless mode. Based on the device connection status shown in FIG. 3, after implementing this solution, it is finally possible to send screen projection related data from the computer 11 to the display device 31 through the wireless screen sharing device 21 with a bandwidth larger than that of the HID data transmission method.

Step S120: a processor creates a virtual network card based on the universal interface, and establishes a communication connection between the virtual network card and the wireless communication module through bridging or network address translation.

Alternatively, the process of the wireless screen sharing device forwarding the data received from the processing device to the display device is implemented by the cooperation of a virtual network card and a wireless communication module. After the wireless screen sharing device is connected to the processing device, there is usually a screen projection application demand. To meet this demand, the processor may start to complete establishment process of an internal screen projection data channel. That is, before the wireless screen sharing device acquires the screen transmission control data and media data sent by the computer, the processor first creates a virtual network card and establishes a communication connection between the virtual network card and the wireless communication module through bridging or network address translation. The processor establishes a communication connection relationship between the virtual network card and the wireless communication module through bridging or network address translation. When the virtual network card receives a network data packet, after the virtual network card and the wireless communication module establish a communication connection relationship, the processor adjusts the network data packet received by the virtual network card in a small data volume based on the changes in the sending and receiving addresses, so that direct forward of the network data packet can be achieved.

For example, when a communication connection relationship is established through network address translation, the method includes: the wireless screen sharing device first receiving a first dynamic host configuration protocol request sent by the computer through a universal interface; in response to the first dynamic host configuration protocol request, allocating a first IP address to the computer based on the IP address of the virtual network card; controlling the wireless communication module to connect with the wireless network where the display device is located, and sending a second dynamic host configuration protocol request to the display device, so that the display device allocates a second IP address to the wireless communication module based on the IP address of the display device; and establishing a network address translation rule based on the first IP address and the second IP address. The network address translation rule is used to perform network address translation on received screen transmission control data. In the application scenarios mainly considered in this solution, the connection relationship between the computer, wireless screen sharing device and display device is fixed, and the three data nodes are linearly connected. Therefore, the four network cards in the three devices may be assigned fixed and different IP addresses during the current screen projection task through the configuration protocol. The wireless screen sharing device located among the three obtains the current network address conversion rule based on the network address, and performs network address conversion based on the network address conversion rule, so that the data acquired from the processing device can be quickly forwarded. Based on a target relationship of data transmission and reception among the three, a source address of the received screen transmission control data is converted from the first IP address to the second IP address; the target address of the received screen transmission control data is converted from a local address of the virtual network card to an IP address of the display device. Of course, this network address translation rule is only necessary when there is a need to forward network data packets.

Step S130: the processor receives a request instruction sent by the processing device. Step S140: the wireless screen sharing device presents the wireless screen sharing device to the computer as a composite device in response to the request instruction, the composite device includes the virtual network card.

Step S130 and step S140 are the receiving process that the processing device sends a request instruction after detecting that the universal interface is connected to the external device, the processor correspondingly receives the request instruction, and the process of responding to the request instruction. After receiving the request instruction, the wireless screen sharing device describes its own device type to the computer based on the parameters requested by the computer, for example, returns the parameters to the computer in the form of a device descriptor. In the actual processing process, the wireless screen sharing device is defined relative to the device type that people know in daily life, rather than an external device that can be recognized by the computer. In the device description based on the general interface, the type of external device connected to the computer needs to be described based on the standard of the corresponding protocol of the general interface. For example, the connected external device is a storage device, HID, communication device, static image device, etc. The external devices actually connected may be described as one or more types on the computer depending on their functions. For example, a USB flash drive connected to a computer via a universal interface is usually described as only a storage device, while a mobile phone connected to a computer via a universal interface may be described as both a communication device and a static image device.

Referring to FIG. 4, in this solution, the wireless screen sharing device 21 needs to be described in the computer 11 as multiple standard types in the protocol, meaning the wireless screen sharing device 21 is presented to the computer 11 as a composite device. As shown in FIG. 4, although the user usually recognizes that the only device connected to the computer 11 is the wireless screen sharing device 21, the wireless screen sharing device 21 is presented as a composite device on the computer 11, which is equivalent to the computer 11 being able to identify the virtual network card 21a through the universal interface, and also having a storage device 21b and a HID 21c.

In the actual processing process, after receiving the response, corresponding to the different device types in the composite device, based on the protocol, the computer specifically performs the subsequent processing required for the data transmission corresponding to the device type. In general, after successfully acquiring a device descriptor in the form of a data packet, the computer acquires the maximum packet length of the default endpoint 0 from the device descriptor; the computer resets the bus again and enters the address setting phase, where the computer and the external device complete the address setting required for data transmission. Different device types have correspondingly different specific setting strategies. For example, for HID devices, the computer also includes the process of sending HID requests and continuing to acquire report descriptors. After the computer has understood the device information of the external device, it will select the most suitable driver for the external device. The driver will configure the external device so that the device is in a configuration state to prepare for subsequent data transmission.

In an embodiment, the wireless screen sharing device further includes a memory, the memory is connected to the processor, the memory stores a first application, the universal driver further includes a storage driver, and the composite device further includes a storage device. As mentioned above, different device types in a composite device have corresponding specific setting strategies and specific data transmission tasks. When the computer confirms from the response that the composite device includes a storage device, the response will trigger the storage driver, that is, the storage driver is called and run by the computer based on the existence of the storage in the response. The storage driver is a back-end running program, which is used to establish a communication channel for the computer to acquire data from the storage of the wireless screen sharing device. Corresponding to the running of the storage driver on the computer, the wireless screen sharing device establishes a communication channel between the computer and the storage device based on the settings of the storage driver. During the process of running the storage driver, the process of establishing a communication channel between the computer and the storage device is invisible to the user. The user may see the result of establishing the communication channel after the running process is completed, that is, whether the storage may be read or not. After the communication channel between the computer and the storage device is established, the processor sends the first application to the computer through the communication channel so that the computer runs the first application. The first application is used to acquire screen transmission control data and media data on the computer, and transmit the screen transmission control data and media data to the data transmission device through the virtual network card. The screen transmission control data is the instruction data corresponding to the control operations in the screen transmission process, such as starting screen transmission, pausing screen transmission, window screen transmission, screen transmission or privacy processing by an extended screen. These control operations may have different control objects, for example, to start screen transmission. If the user presses the switch of the application, the computer will execute it locally. If the user presses the button on the wireless screen transmission device, the operation will be executed locally by the wireless screen transmission device. Pausing may be executed locally on the computer, and privacy processing may be executed by the wireless screen transmission device. For control operations that are not executed locally, the corresponding screen transmission control data are transmitted to the data transmission device through the virtual network card.

During the process of transmitting the first application, the computer may display the drive letter of the memory corresponding to the type of storage device, and when detecting that the user opens the storage directory of the memory through the drive letter on the computer, the computer displays the content stored in the memory, corresponding to the first application, the computer displays its corresponding icon. When receiving a double-click or right-click running operation for the icon of the first application, the wireless screen sharing device loads the first application into the memory of the computer through the communication channel between the computer and the storage device for execution by the central processing unit of the computer, thereby acquiring the screen transmission control data and media data generated by the computer during the screen transmission process. In some other embodiments, the memory of the wireless screen sharing device may cooperate with a file transfer application installed on the computer to send the first application to the computer.

As a type of composite device, the device function of the storage device is mainly assumed by specific storage-related hardware (i.e., memory). Accordingly, the processor sends the first application to the computer through the second communication channel. In fact, after the processor reads the storage data corresponding to the first application from the memory, the processor sends it to the computer through the dedicated communication channel corresponding to the storage device, i.e., the second communication channel.

Alternatively, when the first application is loaded into the memory of the computer, a first confirmation window will pop up. When the first application includes a screen projection control function, the user may confirm whether to start the screen transmission based on this window (e.g., clicking a button for confirmation). If the user confirms screen projection based on the first confirmation window that pops up, after the required channel is established, the first application starts to acquire media data and screen transmission control data. The screen projection control function allows users to choose to project the main screen or the extended screen, to choose to project the window of a specific application instead of the entire screen, to choose to join the screen projection in the form of joining (multiple screens on the same screen) or preempting, to choose whether to project the sound, whether to project the mouse pointer, and to choose the picture quality, etc. These may all be set in the first confirmation window that pops up. In addition, optionally, when the first application is loaded into the computer memory, the first confirmation window may not pop up. At this time, whether to start screen transmission may be determined by receiving the screen transmission instruction through the hardware button of the wireless screen transmission device.

As mentioned above, different device types in a composite device have corresponding specific setting strategies and specific data transmission tasks. When the computer confirms from the response that the composite device includes the virtual network card, the response will trigger the virtual network card driver, that is, the virtual network card driver is called and run by the computer based on the existence of the virtual network card in the response. The virtual network card driver is a back-end running program, which is used to establish a communication channel between the computer and the wireless screen sharing device for transmitting network data through a universal interface. Corresponding to the running of the virtual network card driver on the computer, the wireless screen sharing device establishes a first communication channel between the computer and the storage device based on the setting of the virtual network card driver. During the process of running the virtual network card driver, the process of establishing the first communication channel is invisible to the user. After the running process is completed, the user may see the establishment result of the first communication channel, that is, whether the network connection is established successfully or failed.

In fact, the establishment of the first communication channel is the result of the cooperation between the virtual network card driver in the wireless screen sharing device and the virtual network card driver in the computer. The establishment of the first communication channel is to virtualize a network card in the wireless screen sharing device and a corresponding network card in the computer. Network data transmission may be carried out between the two virtual network cards. The specific physical channel for network data transmission is the communication channel formed by the universal interface connection. That is, the first communication channel is actually a communication channel that uses the pin connection formed by the universal interface connection as the physical carrier and the network data format as the data encoding method. From the application scenario of this solution, the role of the first communication channel is equivalent to connecting the wireless screen sharing device and the computer to the same local area network. If the communication channel between the virtual network card and the actual physical network card is not established, the data of the two virtual network cards may not be sent to devices other than the wireless screen sharing device and the computer. The wireless screen transmission device and the computer send and receive data through the virtual network card, and the wireless screen transmission device and the computer send and receive data through the data channel formed between the two, that is, the first communication channel.

Step S150: the screen transmission control data and media data sent by the processing device is acquired through the virtual network card, the media data is the content displayed on the screen of the processing device.

Step S160: the received screen transmission control data and media data is processed and/or forwarded.

In the device connection status shown in FIG. 3, the wireless screen sharing device 21 is used to display and send the data needed to be sent to the display device 31 from the data received from the computer 11 to the display device 31 through the wireless network for display or response based on the wireless communication module. This is equivalent to the universal interface in the wireless screen sharing device 21 having actually established a physical connection with the wireless communication module. Based on this physical connection, the data received through the first communication channel may be sent to the display device.

Multimedia data is data obtained by acquiring the content displayed on the screen of the processing device in real time, and is sent to another device (i.e., the display device in this embodiment) for reproduction and display.

Screen transmission control data may appear throughout the whole process of screen transmission. The control of the wireless screen sharing device may be direct control on the wireless screen sharing device, for example, the screen transmission button of the wireless screen sharing device is a hardware button, which is set on the top or side of the wireless screen sharing device, and direct control is achieved by operating the hardware button. The control of the wireless screen sharing device may also be remote control on the computer, for example, setting a soft key on the display interface of the computer, and the user may start the screen projection process by clicking the soft key. The screen transmission control data in this embodiment refers to the remote control on the computer.

In an embodiment, corresponding to the screen transmission control data sent by the first application, the wireless screen sharing device responds or sends based on a control target of the screen transmission control data, that is, after the first application is sent to the computer and starts running, the screen transmission control data is acquired in real time and transmitted through the first communication channel. The wireless screen sharing device serves as the counterparty of the screen transmission control data transmission. The processor of the wireless screen sharing device acquires the screen transmission control data sent by the first application through the first communication channel and parses the screen transmission control data; the processor confirms whether to process the screen transmission control data based on the parsing result of the screen transmission control data. For example, the processor parses the privacy control instruction from the received screen transmission control data, and the control instruction is locally processed and responded by the wireless screen sharing device and is not forwarded. For another example, the wireless screen sharing device is provided with an indicator light, which is used to indicate the connection status between the wireless screen sharing device and the display device, for example, a flashing indicator light indicates that the wireless screen sharing device is establishing a connection with the display device, and a solid indicator light indicates that the wireless screen sharing device has successfully connected to the display device. The wireless screen sharing device needs to set the indicator light status based on the current connection status between it and the display device. When the processor parses the control instruction for setting the indicator light status from the received screen transmission control data, the control instruction for the indicator light status is processed and responded to locally by the wireless screen transmission device and is not forwarded.

If the parsed screen transmission control data is not locally processed and responded to by the wireless screen sharing device, the processor forwards the screen transmission control data to the wireless communication module. The process of the wireless screen sharing device sending data to the display device through the wireless communication module may adopt the relatively mature solution of the existing screen projection solution, which will not be elaborated herein.

Based on the above description of the processing process of the two types of screen transmission control data and media data, the overall processing may be considered as the processor parsing the screen transmission control data to determine the control data to be forwarded; based on the communication connection between the processor and the wireless communication module in the data transmission device, the processor controls the virtual network card to send the control data to be forwarded to the wireless communication module, and controls the wireless communication module to send the control data to be forwarded to the display device; the processor determines whether to send the media data to the display device based on the control data to be forwarded, and if forwarding is required, the same processing method is adopted for the control data to be forwarded. Of course, if the screen transmission control data does not need to be forwarded, it will be processed directly locally by the processor.

Overall, in this solution, when the wireless screen sharing device is connected to the computer, it is enumerated as a virtual network card to the computer, thereby establishing a network transmission channel based on the virtual network card. The wireless screen sharing device receives the screen transmission control data in screen sharing from the computer through the network transmission channel. Compared with the HID mode, this embodiment may increase the data transmission bandwidth, so that the transmission rate is faster when the computer transmits content to the wireless screen sharing device, and the quality and/or delay of data content processing by the display device is optimized.

It should be noted that the above sequence of steps is only used to describe the overall design framework of this solution and does not necessarily represent a sequence relationship between two steps. For example, step S110 describes that the wireless screen sharing device is detected by the computer when it is connected to the computer. The detection result may enable the computer to send a request instruction to the wireless screen sharing device, but the processor has a process of receiving and responding to the request instruction. In the actual execution process, the wireless screen sharing device and the computer may also process step S120 while responding to the request instruction. Therefore, changes in the description order do not affect the overall design framework of this solution.

The following is a detailed description of the implementation process of this solution based on the specific universal interface forms under different standards. The detailed description is mainly for the Type-C interface and Type-A interface among the various universal interfaces.

Figure 6:
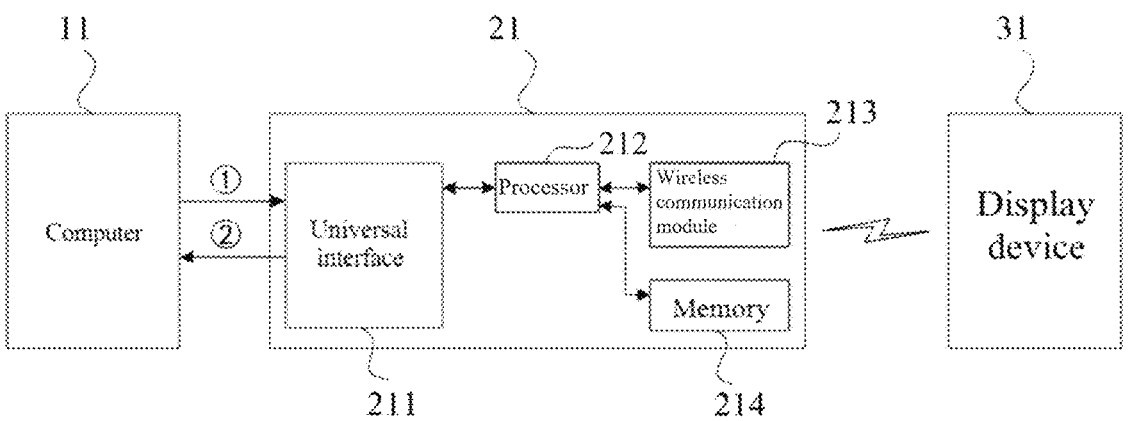
FIG. 6 is a schematic diagram of a communication channel based on a Type-C interface according to an embodiment of the present disclosure.

In an implementation process of an optional interface type, referring to FIG. 6, the universal interface 211 in the wireless screen sharing device 21 is a Type-C interface. The wireless screen sharing device 21 further includes a processor 212, a wireless communication module 213 and a memory 214. Of course, the computer 11 further has a standard Type-C interface socket. When the Type-C interface on the wireless screen sharing device 21 is connected to the computer 11, the computer 11 detects that an external device is connected, and the type of the Type-C interface of the wireless screen sharing device 21 may be recognized by the computer 11.

Based on the implementation process of the previous request instruction, the computer 11 and the wireless screen sharing device 21 establish a first communication channel (i.e., ①in FIG. 6). In addition, a second communication channel may be established at the same time (i.e., ②in FIG. 6, if the memory 214 is writable, the second communication channel may be a bidirectional channel). In addition, on the basis of the physical connection based on the Type-C interface, a HID channel may be established between the computer 11 and the wireless screen sharing device 21. The HID channel is used to send control instructions detected by the display device 31 (such as turning pages of a presentation) to the computer 11, thereby realizing cross-device reverse interactive control of the computer 11 through the operation of the display device 31.

Type-C interface, also known as USB-Type-C, is a hardware interface specification of a universal serial bus with faster transmission speed (up to 10 Gbps) and more powerful power transmission (up to 100 W), and is compatible with USB2.0, USB3.0 and DP (DisplayPort).

Figure 5:
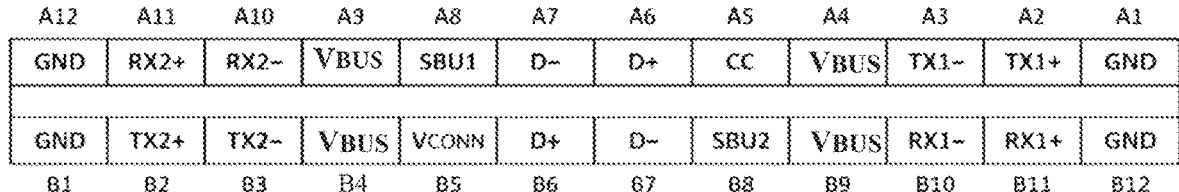
FIG. 5 is a schematic diagram of pin arrangement of a plug end of Type-C interface.

Referring to FIG. 5, the Type-C interface has a total of 24 pins, including two rows of pins with the same function, and the two rows of pins with the same function support forward or reverse insertion. The Type-C interface includes two pairs of power pins (A9, B4, B9, A4), four pairs of differential pins (A11 and B2, A10 and B3, A4 and B10, A2 and B11), and a CC pin (A5) for pairing communication when inserted for pairing. TX+, TX−, RX+ and RX− in each group of pins are differential signal transmission pins, and each group of differential signal transmission pins supports working in USB mode or DP (DisplayPort) mode. When the differential signal transmission pin pair works in USB mode, the signal transmission pin pair transmits USB3.0 signals; when the differential signal transmission pin pair works in DP mode, the signal transmission pin pair is used as a DP (DisplayPort) interface (i.e., corresponding to the DP communication channel).

The wireless screen sharing device based on the Type-C interface is connected to the computer through a universal interface. After the wireless screen sharing device is powered on, the computer may send a request instruction to the wireless screen sharing device through the CC pin of the Type-C interface. The request instruction may be information customized by the supplier. After receiving the request instruction, the wireless screen sharing device sends a response to the computer through its CC pin. The response is used to describe the device properties of data transmission, which may include the current working mode of the wireless screen sharing device, the specific power supply range and other information, as well as a description of the device type of the wireless screen sharing device as a composite device (including at least a virtual network card, and at least one of the device types such as storage devices and HID). The computer may set the power supply voltage for the wireless screen sharing device based on the power supply range information.

In an implementation process of another optional interface type, the universal interface 211 in the wireless screen sharing device 21 is a Type-A interface. After the wireless screen sharing device 21 based on the Type-A interface forms the connection relationship shown in FIG. 3, a communication channel as shown in FIG. 6 may also be formed. In addition to the universal interface of the Type-A standard, the wireless screen sharing device 21 further includes a processor 212, a wireless communication module 213 and a memory 214. Of course, the computer 11 further has a socket of the Type-A interface standard. On the basis of the overall design idea in the foregoing text, corresponding to the implementation process of the request instruction, the computer 11 and the wireless screen sharing device 21 establish a first communication channel (i.e., (①) in FIG. 6). In addition, a second communication channel may be established at the same time (i.e., (②) in FIG. 6, if the memory 214 is writable, the second communication channel may be a bidirectional channel). In addition, on the basis of the physical connection based on the Type-A interface, a HID channel may be established between the computer 11 and the wireless screen sharing device 21. The HID channel is used to send control instructions detected by the display device 31 (such as turning pages of a presentation) to the computer 11, thereby realizing cross-device reverse interactive control of the computer 11 through the operation of the display device 31. In an implementation process, the first application is used to acquire the screen transmission control data and media data of the computer 11, and encode them to obtain second encoded data; that is, after the first application is transmitted to the processing device through the second communication channel for operation, the first application achieves in the running process to simultaneous acquire the screen transmission control data and media data, and directly encode the media data to obtain the second encoded data, and transmit the screen transmission control data to the first communication channel. For the wireless screen sharing device 21, after its processor 212 sends the first application to the computer through the second communication channel, the method further includes: the virtual network card acquiring the second encoded data through the first communication channel; the processor sending the second encoded data to the wireless communication module. In the implementation based on the Type-A interface and the Type-C interface, the screen transmission control data and the media data are directly sent through the first communication channel, that is, the computer 11 sends the media data not by sending only valid media data in the form of a media protocol in the physical connection formed by the universal interface, but by encoding the media data into a network data packet that may be used to send to the network. For the processor 212, there is no need to encode the media data again, and the network data packet may be directly forwarded to the wireless communication module and sent to the display device 31, which can effectively reduce the data processing burden of the processor 212 in the wireless screen sharing device 21.

Figure 7:
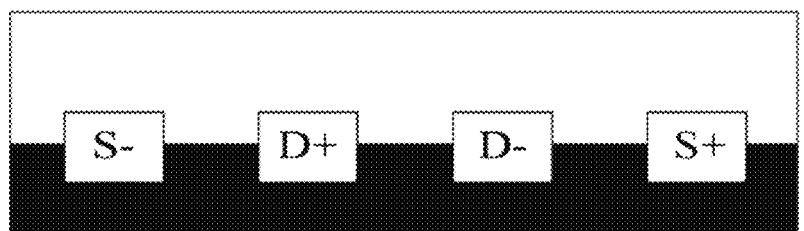
FIG. 7 is a schematic diagram of the pin arrangement of Type-A interface.

Referring to FIG. 7, the Type-A interface has a total of 4 pins, including two power pins (S−, S+) and two data pins (D+, D−). The specific processing mechanism and response process after connection are the same as the real-time process in the overall design description above. The difference lies in the different definitions of the corresponding pins, which will not be repeated herein. It should also be noted that if a wireless screen sharing device itself is a Type-C interface, but the computer only has a Type-A interface, the wireless screen sharing device requires a conversion device to connect to the computer. At this time, the wireless screen sharing device should be regarded as a wireless screen sharing device with a Type-A interface.

For devices of all types of interfaces, the same communication channel is used for the same data, that is, for Type-C interface and Type-A interface, both may be responded to as virtual network cards, and all screen transmission control data and media data may be transmitted through the first communication channel. In this way, the entire transmission process may be completed for communication channels of different interfaces through the same version of the first application, and the data processing burden of the processors in all wireless screen sharing devices can be reduced.

In data transmission devices based on Type-A interface and Type-C interface, data forwarding between the virtual network card and the wireless communication module is forwarded based on the network address rules mentioned above. The corresponding network address translation rule under this network address translation rule may refer to FIG. 8. For network data packets, referring to the first line in FIG. 8, the basic structure in the data packet format includes preamble, destination address, source address, frame type, data and CRC. Each structural unit has a corresponding length. The destination address indicates which device the network data packet needs to be sent to, the source address indicates which device the network data packet is sent from, and the data indicates the entity content of the network data packet. In various embodiments of the present solution, data based on HID and DP (if any) do not need to be sent and received in the form of network data packets. Only data sent and received through the first communication channel are network data packets, which need to be processed based on network address translation rules when forwarding. Address 1, Address 2, Address 3 and Address 4 in the second row of FIG. 8 correspond to the virtual network card (first IP address) of the computer, the virtual network card of the wireless screen sharing device, the wireless communication module of the wireless screen sharing device (second IP address) and the IP address of the display device respectively. Assuming that there is currently a network data packet that needs to be sent from the computer to the display device via the wireless screen sharing device, when encoding the network data packet, Address 1 is encoded as a source address of the network data packet, and Address 2 is encoded as a destination address of the network data packet to obtain the network data packet shown in the third row of FIG. 8. The network data packet is sent from the virtual network card of the computer to the virtual network card of the wireless screen sharing device through the first communication channel. After the wireless screen sharing device receives the network data packet, its processor only needs to replace Address 3 (the second IP address corresponding to the wireless screen sharing device) with the source address and Address 4 (the IP address of the display device) with the target address based on the basic structure of the network data packet to obtain the network data packet shown in the fourth row of FIG. 8, without fully parsing the network data packet based on the above network address conversion rules. The processor sends the network data packet to the wireless communication module so that it may be directly sent to the display device.

In the process of forwarding network data packets by the processor of the wireless screen sharing device, it is only necessary to perform preliminary decoding of the network data packets to acquire the address data of the structural units corresponding to the source address and the destination address, and convert the address data based on the network address conversion rules and the stored IP address, and there is no need to decode and encode the physical data related to screen transmission in the network data packets (such as projection screen data), and the network data packets may be forwarded quickly. During the entire sending process, the encoding of the screen transmission related physical data is completed on a computer with strong data processing capabilities. The wireless screen sharing device only needs to perform simple preliminary decoding and a few bits of data replacement for forwarding, which shortens the data processing time and reduces the data processing tasks of the wireless screen sharing device. The larger bandwidth of the first communication channel is used to realize the rapid transmission of screen projection data in the form of network data packets, thereby further meeting the requirements of high picture quality and good picture synchronization at the same time.

Figure 8:
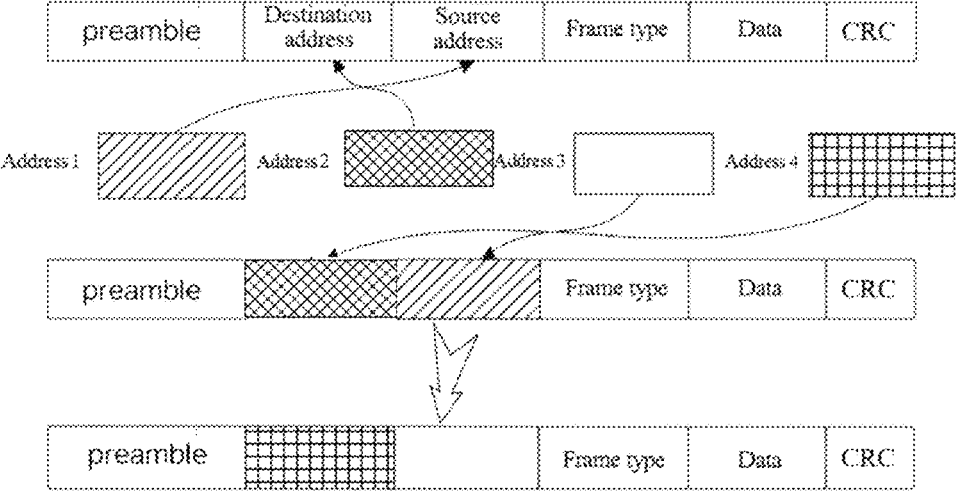
FIG. 8 is a schematic diagram of a network data format and a network address translation process in a data transmission method according to an embodiment of the present disclosure.

It should be noted that FIG. 8 only shows an exemplary illustration of the data packet format of the network data packet (i.e., Ethernet frame) based on the data link layer in the network architecture. In other layers of the network architecture, the data packet formats have corresponding designs. However, in different data packet formats, the target address and the source address are relatively basic structural units. For example, both IPv4 and IPv6 in the IP layer include structural units corresponding to the target address and the source address. When the processor forwards the network data packet and involves processing the target address and the source address, the network address conversion is performed based on the implementation principle described in FIG. 8, that is, only preliminary decoding is required, and after decoding to the point where the target address and the source address may be adjusted, without being further decoded, the target address and the source address are converted into address data based on the network address conversion rules, and encoded into a network data packet for transmission. Correspondingly, only preliminary decoding and a few bits of data replacement are required for forwarding, which shortens the data processing time and reduces the data processing task of the wireless screen sharing device. The larger bandwidth of the first communication channel is used to realize the rapid transmission of screen projection data in the form of network data packets, thereby further meeting the requirements of high picture quality and good picture synchronization.

According to the above method, the data transmission method is applied to a data transmission device, the data transmission device includes a processor, a universal interface and a wireless communication module, the universal interface and the wireless communication module are both connected to the processor, and the universal interface is used to connect to the processing device; the data transmission method includes: when the universal interface is connected to the processing device, the universal interface being detected by the processing device; a processor creating a virtual network card based on the universal interface, and establishing a communication connection between the virtual network card and the wireless communication module through bridging or network address translation; the processor receiving a request instruction sent by the processing device, where the request instruction is used to request device information of the data transmission device; the processor presenting the data transmission device as a composite device to the processing device in response to the request instruction, where the composite device includes the virtual network card; acquiring screen transmission control data and media data sent by the processing device through the virtual network card, where the media data is a content displayed on a screen of the processing device; the processor parsing the screen transmission control data to determine the control data to be forwarded; based on the communication connection, the processor controlling the virtual network card to send the control data to be forwarded to the wireless communication module, and controlling the wireless communication module to send the control data to be forwarded to the display device; and the processor determining whether to send the media data to the display device based on the control data to be forwarded. When the data transmission device is connected to the processing device, the data transmission device enumerates it as a virtual network card to the processing device, thereby establishing a network transmission channel based on the virtual network card. The data transmission device receives the screen transmission control data and media data in the screen sharing from the processing device through the network transmission channel, thereby improving the data transmission bandwidth. The transmission rate of the processing device to transmit the screen projection related content to the data transmission device is faster, thereby optimizing the quality and/or delay of the data content processed by the display device.

Figures 9, 10:
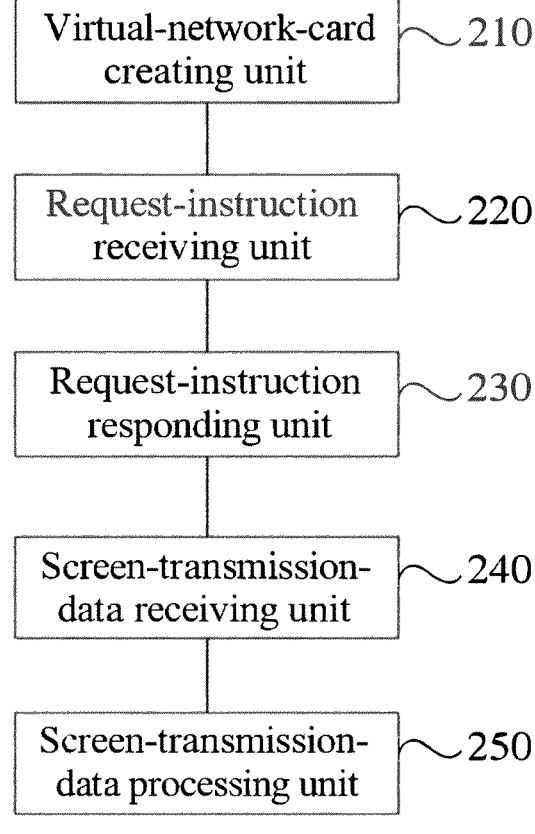
FIG. 9 is a schematic diagram of a structure of a data transmission device according to an embodiment of the present disclosure.
FIG. 10 is a schematic diagram of a structure of a data transmission device according to an embodiment of the present disclosure.

FIG. 9 is a schematic diagram of a structure of a data transmission device according to an embodiment of the present disclosure. The data transmission device is applied to a data transmission device, including a processor, a universal interface and a wireless communication module. The universal interface and the wireless communication module are both connected to the processor, and the universal interface is configured to connect with the processing device; when the data transmission device is connected to the processing device, the data transmission device being detected by the processing device, so that the processing device sends a request instruction to the data transmission device. The request instruction is used to request device information of the data transmission device. The processing device is pre-installed with a universal driver, and the universal driver includes a virtual network card driver. Referring to FIG. 9, the data transmission device includes a virtual-network-card creating unit 210, a request-instruction receiving unit 220, a request-instruction responding unit 230, a screen-transmission-data receiving unit 240 and a screen-transmission-data processing unit 250.

The virtual-network-card creating unit 210 is configured for the processor to create a virtual network card based on the universal interface, and establish a communication connection between the virtual network card and the wireless communication module through bridging or network address translation; the request-instruction receiving unit 220 is configured for the processor to receive a request instruction sent by the processing device, and the request instruction is used to request the device information of the data transmission device; the request-instruction responding unit 230 is configured for the processor to present the data transmission device as a composite device to the processing device in response to the request instruction, and the composite device includes the virtual network card; the screen-transmission-data receiving unit 240 is configured to acquire screen transmission control data and media data sent by the processing device through the virtual network card, and the media data is a content displayed on a screen of the processing device; the screen-transmission-data processing unit 250 is configured for the processor to parse the screen transmission control data to determine the control data to be forwarded; control the virtual network card to send the control data to be forwarded to the wireless communication module, and control the wireless communication module to send the control data to be forwarded to the display device; determine whether to send the media data to the display device based on the control data to be forwarded.

Based on the above embodiment, the virtual-network-card creating unit 210 includes:

a configuration-request receiving module, configured to receive a first dynamic host configuration protocol request sent by a processing device through a universal interface;

a first address allocating module, configured to in response to the first dynamic host configuration protocol request, allocate a first IP address to the processing device based on the IP address of the virtual network card;

a wireless-connection configuring module, configured to control the wireless communication module to connect with the wireless network where the display device is located, and send a second dynamic host configuration protocol request to the display device, so that the display device allocates a second IP address to the wireless communication module based on the IP address of the display device;

a conversion-rule establishing module, configured to establish a network address conversion rule based on the first IP address and the second IP address, and the network address conversion rule is used to perform network address conversion on received screen transmission control data and media data.

Based on the above embodiment, the network address translation rule includes:

converting the source address of the received screen transmission control data and media data from the first IP address to the second IP address; and converting a target address of the received screen transmission control data and media data from the local address of the virtual network card to the IP address of the display device.

Based on the above embodiment, the data transmission device further includes a memory, the memory is connected to the processor, the memory stores a first application program, and the composite device further includes a storage device;

the data transmission device further includes:

an application sending unit, configured for the processor to send the first application to a processing device through the storage device so that the processing device runs the first application. The first application is used to acquire screen transmission control data and media data on the processing device, and transmit the screen transmission control data and media data to the virtual network card.

Based on the above embodiment, the screen-transmission-data processing unit 250 includes:

a control-data receiving module, configured for the processor to acquire the screen transmission control data sent by the first application through the virtual network card, and parse the screen transmission control data;

an analysis-result judging module, configured for the processor to confirm whether to process the screen transmission control data based on the analysis result of the screen transmission control data;

a control-data forwarding module, configured for the processor to determine that the screen transmission control data is the control data to be forwarded if the parsing result is no.

Based on the above embodiment, the universal interface is a Type-A interface, and the first application is further used to encode the media data to obtain second encoded data;

the data transmission device further includes:

a coded-data receiving unit, configured for the virtual network card to acquire second coded data from the processing device; and a coded-data forwarding unit, configured for the processor to control the virtual network card to send the second coded data to the wireless communication module.

The data transmission device according to the embodiments of the present disclosure may be used to execute or cooperate with the execution of any of the data transmission methods according to the above embodiments, and has corresponding functions and beneficial effects.

It should be noted that in the embodiment of the above-mentioned data transmission device, the various units and modules are only divided based on functional logic, but are not limited to the above-mentioned division, as long as the corresponding functions may be achieved; in addition, the names of the functional units are only for the convenience of distinguishing each other, and are not used to limit the scope of protection of the present disclosure.

FIG. 10 is a schematic diagram of a structure of a data transmission device according to an embodiment of the present disclosure. Referring to FIG. 10, the data transmission device 20 includes: a universal interface 211, a wireless communication module 213 and a processor 212; the universal interface 211 and the wireless communication module 213 are both connected to the processor 212, and the universal interface is used to connect to the processing device;

when the data transmission device 20 is connected to the processing device, the data transmission device 20 is detected by the processing device, so that the processing device sends a request instruction to the data transmission device 20, the request instruction is used to request device information of the data transmission device 20, the processing device is pre-installed with a universal driver, and the universal driver includes a virtual network card driver;

the processor 212 is configured to:

present the data transmission device 20 as a composite device to the processing device in response to the request instruction, where the composite device includes the virtual network card;

establish a first communication channel between the processing device and the virtual network card based on the setting of the virtual network card driver, where the virtual network card driver is run by the processing device based on the response call;

acquire screen transmission control data and media data sent by the processing device through the first communication channel;

parse the screen transmission control data to determine the control data to be forwarded;

determine whether to send the media data to the display device based on the control data to be forwarded;

send the control data to be forwarded to the display device through the wireless communication module, and when the processor determines to send the media data to the display device, send the media data to the display device.

The universal interface in the data transmission device is, for example, a Type-A interface.

To fully implement the screen projection function or achieve a better screen projection experience, the data transmission device in this solution may include a memory 214, and the memory 214 may store applications or configuration parameters, etc., for local operation during the screen projection process or for acquisition and operation by the processing device. For example, the first application 214a is stored and may be sent to the processing device for operation, allowing the processing device to run the screen projection program without requiring manual installation.

The data transmission device according to the embodiments of the present disclosure may be used to execute or assist in executing any of the data transmission methods described in the above embodiments, possessing corresponding functions and beneficial effects.

It should be noted that in the embodiment of the above-mentioned data transmission device, the various units and modules are only divided based on functional logic, but are not limited to the above-mentioned division, as long as the corresponding functions may be achieved; in addition, the names of the functional units are only for the convenience of distinguishing each other, and are not used to limit the scope of protection of the present disclosure.

According to the embodiment of the present disclosure, a data transmission device is further provided, including a universal interface, a virtual network card, a wireless communication module and a processor; the universal interface and the wireless communication module are both connected to the processor;

the universal interface is configured to connect with the processing device;

the virtual network card is configured to acquire screen transmission control data and media data from the processing device;

the processor is configured to parse the screen transmission control data acquired by the virtual network card to determine the control data to be forwarded and control the virtual network card to send the control data to be forwarded to the wireless communication module, and determine whether to control the virtual network card to send the media data to the wireless communication module based on the control data to be forwarded;

the wireless communication module is configured to send the control data to be forwarded to the display device, and to send the media data sent by the virtual network card to the display device.

The universal interface in the data transmission device is, for example, a Type-A interface.

The data transmission device according to the embodiments of the present disclosure may be used to execute or cooperate in executing any of the data transmission methods according to the above embodiments, and has corresponding functions and beneficial effects.

It should be noted that in the embodiment of the above-mentioned data transmission device, the various units and modules are only divided based on functional logic, but are not limited to the above-mentioned division, as long as the corresponding functions may be achieved; in addition, the names of the functional units are only for the convenience of distinguishing each other, and are not used to limit the scope of protection of this application.

According to an embodiment of the present disclosure, a computer-readable storage medium is further provided, on which a computer program is stored. When the computer program is executed by a processor, the relevant operations in the data transmission method according to any embodiment of the present disclosure are implemented, and have corresponding functions and beneficial effects.

Those skilled in the art should understand that the embodiments of the present disclosure may be provided as methods, systems, or computer program products.

Therefore, the present disclosure may take the form of an entirely hardware embodiment, an entirely software embodiment, or an embodiment combining software and hardware aspects. Moreover, the present disclosure may take the form of a computer program product implemented on one or more computer-usable storage media (including but not limited to disk storage, CD-ROM, optical storage, etc.) containing computer-usable program codes. The present disclosure is described with reference to flowcharts and/or block diagrams of methods, devices (systems), and computer program products according to embodiments of the present disclosure. It should be understood that each process and/or block in the flowchart and/or block diagram, and a combination of the processes and/or blocks in the flowchart and/or block diagram may be implemented by computer program instructions. These computer program instructions may be provided to a processor of a general-purpose computer, a special-purpose computer, an embedded processor or other programmable data processing device to produce a machine, so that the instructions executed by the processor of the computer or other programmable data processing device produce a device for implementing the functions specified in one or more processes in the flowchart and/or one or more blocks in the block diagram. These computer program instructions may also be stored in a computer-readable memory that may direct a computer or other programmable data processing device to work in a specific manner, so that the instructions stored in the computer-readable memory produce a manufactured product including an instruction device that implements the functions specified in one or more processes in the flowchart and/or one or more boxes in the block diagram. These computer program instructions may also be loaded onto a computer or other programmable data processing device so that a series of operational steps are executed on the computer or other programmable device to produce a computer-implemented process, whereby the instructions executed on the computer or other programmable device provide steps for implementing the functions specified in one or more processes in the flowchart and/or one or more boxes in the block diagram.

In a typical configuration, a computing device includes one or more processors (CPU), input/output interfaces, network interfaces, and memory. The memory may include non-permanent memory in a computer-readable medium, random access memory (RAM) and/or non-volatile memory in the form of read-only memory (ROM) or flash RAM. The memory is an example of a computer-readable medium.

Computer-readable media include both permanent and non-permanent, removable and non-removable media that may be implemented by any method or technology for storage of information. The information may be computer-readable instructions, data structures, program modules or other data. Examples of computer storage media include, but are not limited to, phase-change random access memory (PRAM), static random access memory (SRAM), dynamic random access memory (DRAM), other types of random access memory (RAM), read-only memory (ROM), electrically erasable programmable read-only memory (EEPROM), flash memory or other memory technology, compact disk-read-only memory (CD-ROM), digital versatile disk (DVD) or other optical storage, magnetic cassettes, magnetic tape, magnetic disk storage or other magnetic storage devices, or any other non-transmission medium that may be used to store information that may be accessed by a computing device. Based on the definition in this description, computer-readable media does not include temporary computer-readable media (transitory media), such as modulated data signals and carrier waves.

It should also be noted that the terms "comprises," "includes," or any other variations thereof are intended to cover non-exclusive inclusion, such that a process, method, commodity, or apparatus that includes a series of elements includes not only those elements, but also other elements not explicitly listed, or also includes elements inherent to such process, method, commodity, or apparatus. In the absence of more constraints, an element defined by the phrase "comprises a . . . " does not exclude the existence of additional identical elements in the process, method, product or apparatus comprising the element.

It should be noted that the above are only preferred embodiments and technical principles used in the present disclosure. Those skilled in the art will appreciate that the present disclosure is not limited to the specific embodiments herein, and that various obvious modifications, rearrangements, and substitutions may be made by those skilled in the art without departing from the scope of protection of the present disclosure. Therefore, although the present disclosure has been described in detail through the above embodiments, the present disclosure is not limited to the above embodiments, and may include more other equivalent embodiments without departing from the concept of the present disclosure. The scope of the present disclosure is determined by the scope of the attached claims.

What is claimed is:

1. A data transmission method applied to a data transmission device, wherein the data transmission device comprises a processor, a universal interface, and a wireless communication module, the universal interface and the wireless communication module are both connected to the processor, and the universal interface is configured to connect with a processing device, the method comprising:

connecting the universal interface to the processing device;

creating, by the processor, a virtual network card based on the universal interface, and establishing a communication connection between the virtual network card and the wireless communication module through bridging or network address translation;

receiving, by the processor, a request instruction sent by the processing device, wherein the request instruction is used to request device information of the data transmission device;

presenting, by the processor, the data transmission device as a composite device to the processing device in response to the request instruction, wherein the composite device includes the virtual network card;

acquiring screen transmission control data and media data sent by the processing device through the virtual network card, wherein the media data is a content displayed on a screen of the processing device;

parsing, by the processor, the screen transmission control data to determine the control data to be forwarded;

based on the communication connection, controlling, by the processor, the virtual network card to send the control data to be forwarded to the wireless communication module, and controlling the wireless communication module to send the control data to be forwarded to the display device; and determining, by the processor, whether to send the media data to the display device based on the control data to be forwarded.

2. The data transmission method of claim 1, wherein the establishing the communication connection between the virtual network card and the wireless communication module through network address translation comprises:

receiving a first dynamic host configuration protocol request sent by the processing device through the universal interface;

in response to the first dynamic host configuration protocol request, allocating a first IP address to the processing device based on the IP address of the virtual network card;

controlling the wireless communication module to connect with the wireless network where the display device is located, and sending a second dynamic host configuration protocol request to the display device, so that the display device allocates a second IP address to the wireless communication module based on the IP address of the display device; and establishing a network address translation rule based on the first IP address and the second IP address, wherein the network address translation rule is used to perform network address translation on received screen transmission control data.

3. The data transmission method of claim 2, wherein the network address translation rule comprises:

converting a source address of the received screen transmission control data and media data from the first IP address to the second IP address; and converting a target address of the received screen transmission control data and media data from a local address of the virtual network card to a IP address of the display device.

4. The data transmission method of claim 1, wherein the data transmission device further comprises a memory, the memory is connected to the processor, the memory is configured to store a first application, and the composite device further includes a storage device;

after the processor presenting the data transmission device as the composite device to the processing device in response to the request instruction, the method further comprises:

sending, by the processor, the first application to the processing device through the storage device so that the processing device runs the first application, wherein the first application is used to acquire screen transmission control data and media data on the processing device, and transmit the screen transmission control data and media data to the virtual network card.

5. The data transmission method of claim 4, wherein the parsing the screen transmission control data to determine the control data to be forwarded comprises:

acquiring, by the processor, screen transmission control data sent by the first application through the virtual network card, and parsing the screen transmission control data;

confirming, by the processor, whether to process the screen transmission control data based on a parsing result of the screen transmission control data; and response to not processing the screen transmission control data, determining, by the processor, that the screen transmission control data is the control data to be forwarded.

6. The data transmission method of claim 4, wherein the universal interface is a Type-A interface, and the first application is further used to encode the media data to obtain second encoded data;

after sending, by the processor, the first application to the processing device through the storage device, the method further comprises:

acquiring, by the virtual network card, second coded data from the processing device; and controlling, by the processor, the virtual network card to send the second coded data to the wireless communication module.

7. A data transmission device, comprising:

a universal interface;

a wireless communication module; and a processor, wherein the universal interface and the wireless communication module are both connected to the processor, and the universal interface is configured to connect with a processing device;

response to the data transmission device is connected to the processing device, the processing device sends a request instruction to the data transmission device, wherein the request instruction is used to request device information of the data transmission device, the processing device is pre-installed with a universal driver, and the universal driver includes a virtual network card driver;

wherein the processor is configured to:

present the data transmission device as a composite device to the processing device in response to the request instruction, wherein the composite device includes the virtual network card;

establish a first communication channel between the processing device and the virtual network card based on the setting of the virtual network card driver, wherein the virtual network card driver is run by the processing device based on a response call;

acquire screen transmission control data and media data sent by the processing device through the first communication channel;

parse the screen transmission control data to determine the control data to be forwarded;

determine whether to send the media data to the display device based on the control data to be forwarded; and send the control data to be forwarded to the display device through the wireless communication module, and send the media data to the display device when the processor determines to send the media data to the display device.

8. The data transmission device of claim 7, wherein the universal interface is a Type-A interface.

9. The data transmission device of claim 7, further comprising a memory connected to the processor, wherein the memory is configured to store a first application, and the composite device further includes a storage device;

the processor is further configured to: after presenting the data transmission device as the composite device to the processing device, send the first application to the processing device through the storage device so that the processing device runs the first application, wherein the first application is used to acquire screen transmission control data and media data on the processing device, and transmit the screen transmission control data and media data to the virtual network card.

10. The data transmission device of claim 9, wherein the parsing the screen transmission control data to determine the control data to be forwarded comprises:

acquiring, by the processor, screen transmission control data sent by the first application through the virtual network card, and parsing the screen transmission control data;

confirming, by the processor, whether to process the screen transmission control data based on the parsing result of the screen transmission control data; and response to not processing the screen transmission control data, determining, by the processor, that the screen transmission control data is the control data to be forwarded.

11. The data transmission device of claim 9, wherein the universal interface is a Type-A interface, and the first application is further used to encode the media data to obtain second encoded data;

wherein the processor is further configured to: after sending the first application to the processing device through the storage device, acquire, by the virtual network card, second coded data from the processing device; and control, by the processor, the virtual network card to send the second coded data to the wireless communication module.

12. A data transmission device, comprising:

a universal interface;

a virtual network card;

a wireless communication module; and a processor;

wherein the universal interface and the wireless communication module are both connected to the processor;

the universal interface is configured to connect with a processing device, wherein the universal interface is a Type-A interface;

the virtual network card is configured to acquire screen transmission control data and media data from the processing device;

the processor is configured to parse the screen transmission control data acquired by the virtual network card to determine the control data to be forwarded and control the virtual network card to send the control data to be forwarded to the wireless communication module, and determine whether to control the virtual network card to send the media data to the wireless communication module based on the control data to be forwarded;

the wireless communication module is configured to send the control data to be forwarded to the display device, and to send the media data sent by the virtual network card to the display device.

13. The data transmission device of claim 12, further comprising a memory connected to the processor, wherein the memory is configured to store a first application, and the composite device further includes a storage device;

the processor is further configured to: after presenting the data transmission device as a composite device to the processing device, send the first application to the processing device through the storage device so that the processing device runs the first application, wherein the first application is used to acquire screen transmission control data and media data on the processing device, and transmit the screen transmission control data and media data to the virtual network card.

14. The data transmission device of claim 12, wherein the parsing the screen transmission control data to determine the control data to be forwarded comprises:

acquiring, by the processor, screen transmission control data sent by the first application through the virtual network card, and parsing the screen transmission control data;

confirming, by the processor, whether to process the screen transmission control data based on the parsing result of the screen transmission control data; and response to not processing the screen transmission control data, determining, by the processor, that the screen transmission control data is the control data to be forwarded.

* * * * *